United States Patent [19]

Smith, Jr.

[11] Patent Number: 4,631,405
[45] Date of Patent: Dec. 23, 1986

[54] METHOD AND APPARATUS FOR DUAL-SPACED FAST/EPITHERMAL NEUTRON POROSITY MEASUREMENTS

[75] Inventor: Harry D. Smith, Jr., Houston, Tex.

[73] Assignee: Halliburton Company, Duncan, Okla.

[21] Appl. No.: 678,423

[22] Filed: Dec. 5, 1984

[51] Int. Cl.⁴ .............................................. G01V 5/00
[52] U.S. Cl. .................................... 250/266; 250/269
[58] Field of Search ............... 250/253, 256, 265, 266, 250/270, 269

[56] References Cited

U.S. PATENT DOCUMENTS

| | | | |
|---|---|---|---|
| 3,774,033 | 11/1973 | Scott et al. | 250/266 |
| 4,122,339 | 10/1978 | Smith, Jr. et al. | 250/270 |
| 4,152,590 | 5/1979 | Smith, Jr. et al. | 250/266 |

Primary Examiner—Janice A. Howell
Attorney, Agent, or Firm—W. J. Beard

[57] ABSTRACT

An earth formation is irradiated with fast neutrons (18), and the formation porosity is determined by a dual-spaced fast/epithermal neutron measurement in which the fast neutron population is measured at a different source-detector spacing (20) than that used for measuring the epithermal neutron population (40).

2 Claims, 3 Drawing Figures

METHOD AND APPARATUS FOR DUAL-SPACED FAST/EPITHERMAL NEUTRON POROSITY MEASUREMENTS

BACKGROUND OF THE INVENTION

The present invention relates to radiological well logging methods and apparatus for investigating the characteristics of subsurface earth formations traversed by a borehole. More particularly, the invention relates to methods and apparatus for measuring the porosity of earth formations in the vicinity of a well borehole by means of neutron well logging techniques.

In the search for liquid hydrocarbons beneath the earth's crust, one of the parameters which must be known about the earth formation is the formation porosity. The porosity, or fractional volume of fluid filled pore space present in and around the rock matrix comprising the earth formation, is needed both to evaluate the formation's commercial production potential, and also to assist in the interpretation of other logs, such as resistivity logs and pulsed neutron logs.

Several techniques have been developed in the prior art to measure earth formation porosity in a borehole environment. One such technique employs a gamma ray source and one or more detectors for measuring the electron density of the earth formations by the amount of gamma ray scattering. Since rock matrix is more dense than pore fluid, this leads to an inferential measurement of the porosity of the formations. Another technique employs an acoustic transmitter and one or more acoustic receivers. The velocity of sound transmission through the formation from the acoustic transmitter to the receivers is then measured. Since rock is more dense than pore fluid, the sound travels faster in less porous rocks than it does in fluid filled pore spaces in more porous earth formations. The measured sound velocity can then be related to the formation porosity.

A third commercial technique which has been employed in the prior art to measure the porosity of earth formations employs a neutron source and any of several types of neutron or gamma ray detectors, depending upon the energy ranges of the neutrons being measured. Because the behavior and interactions of neutrons with matter are quite distinct depending upon their energies, such neutrons are generally divided into at least three distinct energy ranges: fast, epithermal, and thermal. Generally speaking, fast neutrons are those with energies around one Mev (within an order of magnitude or so). Epithermal neutrons have energies around one ev. Thermal neutrons are in thermal equilibrium with their environment and have energies around 0.025 ev. The neutron sources commonly employed all emit neutrons in the fast energy range. Depending upon the formation constituents into which the neutrons are emitted, these energies will then be attenuated at various rates by interactions with the matter in the formation. Generally speaking, hydrogen is the principal agent responsible for slowing down neutrons in an earth formation.

In high porosity formations, fast neutrons are attenuated principally both by inelastic scattering with the rock constituents and by elastic scattering with the hydrogen in the pore fluid. Epithermal neutrons are attenuated by elastic scatter with hydrogen. Inelastic scattering does not affect epithermal neutrons since their energies are below the inelastic reaction threshold energies. Ultimately, the neutrons become thermalized and are absorbed by the nuclei of formation constituents.

In low porosity formations, fast neutrons are attenuated mainly by inelastic scattering with the rock constituents. Epithermal neutrons, however, have a much smaller relative attenuation cross-section since there is very little pore fluid, and hence hydrogen, present.

A common neutron porosity logging technique is one which employs either a neutron or gamma ray detector which is sensitive to the intensity of the thermalized neutrons at some point removed from the neutron source. Then, in a formation containing a larger amount of hydrogen than is present in low porosity formations, the neutron distribution is more rapidly slowed down, and is contained in the area of the formation near the source. Therefore, the counting rates in remote thermal neutron sensitive detectors located several inches or more from the source will be suppressed. In lower porosity formations which contain little hydrogen, the source neutrons are able to penetrate farther. Hence, the counting rates in the more remote detector or detectors are increased. This behavior may be directly quantified into a measurement of the porosity by well established procedures. Combinations (e.g., ratios) of the count rates in two or more detectors at different distances from the neutron source are sometimes employed for improved results. In such a case, the ratio of the near spaced to the far spaced detector count rates is observed to increase as porosity increases. The measurement technique is thus essentially spatial, relying upon variations in the spatial distribution of the neutrons.

Such commercial methods utilizing thermal neutron measurements have generally not proven to be as accurate as desirable due to diameter irregularities of the borehole wall, variation of the properties of different borehole fluids, the irregular cement annulus surrounding the casing in a cased well borehole, and the properties of different types of steel casings and formation lithologies which surround the borehole. For example, since chlorine has a high absorption cross-section for thermal neutrons, the thermal neutron distribution surrounding a prior art source and detector pair sonde can be affected by the chlorine content of the borehole fluid. Similarly, lithological properties of the earth formations in the vicinity of the borehole, such as the shale or boron content of these formations, can affect the measurement of thermal neutron populations. Also, thermal neutron measurements are very sensitive to the formation matrix type, i.e., whether the formation matrix is sand, limestone, or dolomite.

Improved methods and apparatus for such measurements have been suggested which employ epithermal and/or fast neutrons. As described above, these are less sensitive to formation lithology effects, and are not affected by small concentrations of strong thermal neutron absorbers such as chlorine or boron. One prior art fast/epithermal neutron technique which does not rely on purely spatial concepts is described in U.S. Pat. No. 4,134,001 (Smith, Jr. et al., issued Jan. 9, 1979). As disclosed in greater detail therein, the method and apparatus employ a ratio measurement of fast/epithermal neutron flux in two detectors approximately equally spaced from a fast neutron source. (Differences in the detector-source distances are supposed to be compensated, as by weighting the ratio.) Porosity is then determined as a function of changes in the shape of the overall neutron spectrum between fast and epithermal energies. ("Spectrum", in this reference, refers to the gross count rate differences between fast and epithermal neutrons. Specific spectra of the fast and of the epithermal neutrons are not themselves utilized or taken.)

While such techniques as described above are effective, it would be a distinct advantage and improvement if a significantly greater dynamic range could be realized than is provided by these prior art techniques alone. Accordingly, a need still remains for improved methods and apparatus for measuring formation porosity using neutron measurement techniques. Preferably such methods and apparatus will lend themselves to crossplotting with other independent porosity measurements (e.g., sonic, density, and other neutron).

SUMMARY OF THE INVENTION

Briefly, the present invention meets the above needs and purposes with an improved method and apparatus using dual-spaced fast/epithermal neutron measurements for determining the porosity of earth formations in the vicinity of a well borehole. That is, a combination of the two effects discussed above is used: the effect of changes in count rates at different distances is combined with the effect of changes in the shape of the neutron spectrum between fast and epithermal energies. The result of this combination is a porosity measurement with a greater dynamic range than either effect alone.

First, the earth formations in the vicinity of the well borehole are irradiated with a source of fast neutrons. Such a source may be a chemical source (e.g., an AmBe source) or a 14 Mev dueterium-tritium accelerator type neutron generator. Then the fast neutron population is detected at a first spaced distance from the neutron source in the borehole, and signals representative of the detected fast neutron population are generated. These signals may take the form of a measurement of fast neutron flux, or a measurement of inelastic scattering gamma rays, which are directly related to the fast neutron intensity. The epithermal neutron population is also detected, at a second spaced distance from the neutron source in the borehole, and signals representative of the detected epithermal neutron population are likewise generated. The second spaced distance is different from the first. (In the preferred embodiment, the second spaced distance is greater.)

Next, the fast and epithermal neutron population representative signals are combined to derive a measurement signal functionally related to the porosity of the earth formations in the vicinity of the borehole. In the preferred embodiment, they are combined by taking the ratio of the first neutron population measurement to the epithermal neutron population measurement. The resulting ratio is thus affected by, and takes advantage of, both the spectral porosity sensitivity effect and the spatial porosity sensitivity effect.

It is therefore a feature of the present invention to provide an improved method and apparatus for determining the porosity of earth formations in the vicinity of a well borehole; such a method and apparatus which determines the porosity using neutron logging techniques; in which the earth formations in the vicinity of the well borehole are irradiated with a source of fast neutrons; in which the resulting fast neutron population is detected in the borehole at a first spaced distance from the neutron source; in which signals are generated which are representative of the detected fast neutron population at this first spaced distance; in which the epithermal neutron population is detected in the borehole at a second spaced distance from the neutron source, the second distance being different from the first; in which signals are generated which are representative of the detected epithermal neutron population at this second spaced distance; in which these fast and epithermal neutron population representative signals are combined to derive a measurement signal functionally related to the porosity of the adjacent earth formations; and to accomplish the above features and purposes in an uncomplicated, versatile, accurate, inexpensive, and reliable method and apparatus readily suited to utilization in the widest possible earth formation porosity measurement applications.

Other features and advantages of the invention will be apparent from the following description, the accompanying drawings, and the appended claims.

DESCRIPTION OF THE PREFERRED EMBODIMENTS

Figures 1, 3:
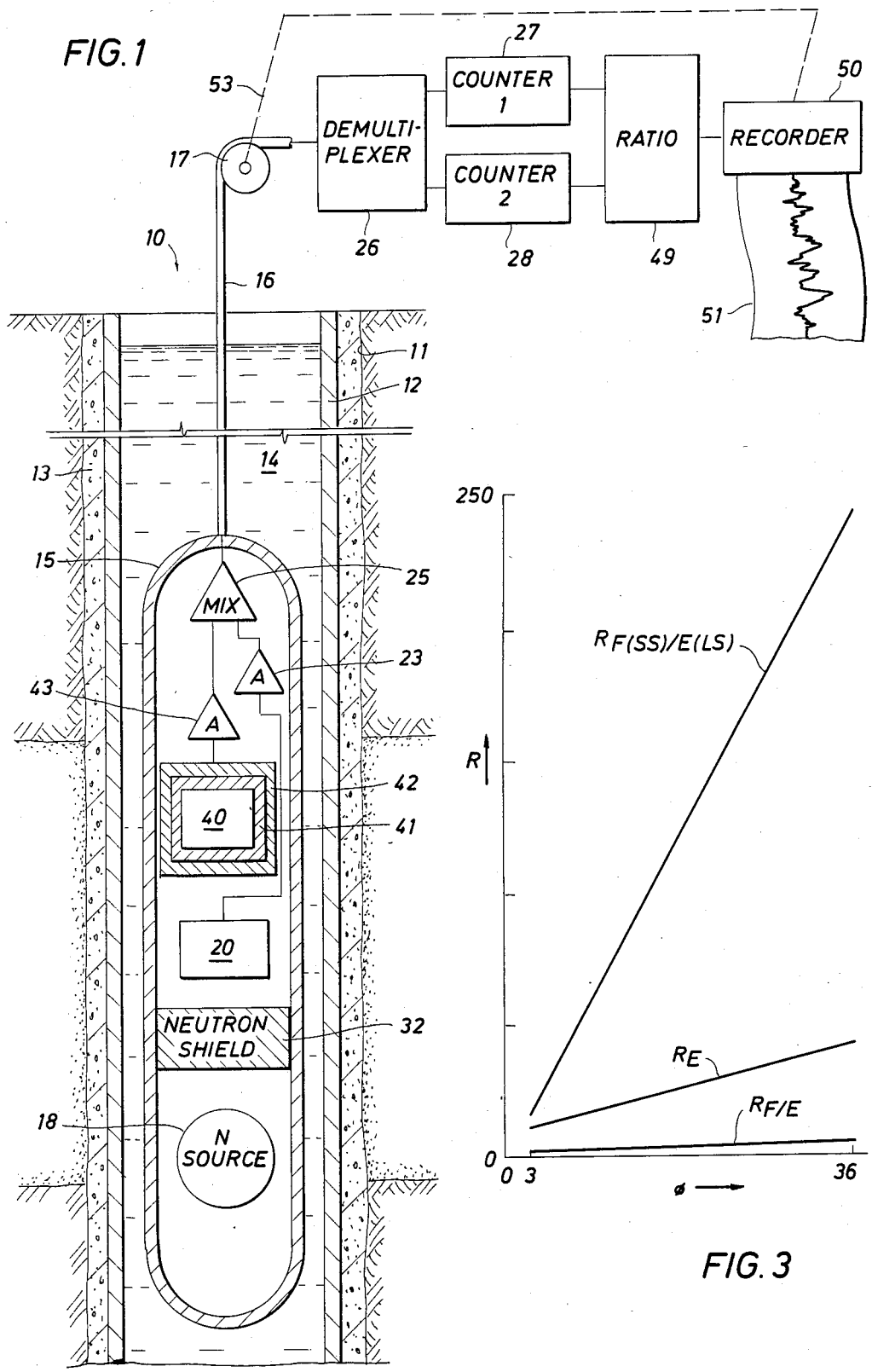
FIG. 1 is a schematic illustration showing a well logging system according to the principles of the present invention.
FIG. 3 is a graphical relationship illustrating the improved porosity sensitivity provided by the dual-spaced fast/epithermal ratio measurement according to the present invention.

With reference to the drawings, the new and improved method and apparatus for determining the porosity of earth formations in the vicinity of a well borehole will now be described. FIG. 1 shows a simplified schematic functional representation of a well logging apparatus 10 in accordance with the present invention. A well borehole 11 which penetrates several earth formations is lined with a steel casing 12 and filled with a well fluid 14. The steel casing 12 may be cemented in place by cement layer 13, which also serves to prevent fluid communication between adjacent producing formations in the earth. The well borehole 11 may also be uncased and filled with drilling fluid.

The downhole portion of the logging system 10 may be seen to be basically composed of an elongated, fluid tight, hollow body member or sonde 15 which is sized for passage through the casing 12, and during the logging operation is passed longitudinally therethrough. Surface instrumentation, whose function will be discussed in more detail subsequently, is shown for processing and recording electrical measurements provided by the sonde 15.

A well logging cable 16 passes over a sheave wheel 17 and supports the sonde 15 in the borehole 11. Cable 16 also provides a communication path for electrical signals to and from the surface equipment and the sonde 15. The well logging cable 16 may be of conventional armored cable design and may have one or more electrical conductors for transmitting such signals between the sonde 15 and the surface instrumentation apparatus.

Again referring to FIG. 1, the sonde 15 contains, at its lower end, a neutron source 18. This neutron source may comprise a typical continuous chemical neutron source such as actinium-berylium, Californium 252, or Americium-berylium. Alternatively, a 14 Mev deuterium-tritium accelerator type neutron source, which produces essentially monoenergetic 14 Mev neutrons, may be used, as in a continuous or pulsed operation mode, if desired, according to the concepts of the present invention.

Radiation detector 20 is provided in the downhole sonde 15 and is separated from the neutron source 18 by a neutron shielding material 32. The neutron shielding material 32 may comprise any material which serves to effectively slow down and/or scatter the source neutrons, hence shielding detector 20 from direct neutron irradiation by the neutron source 18. Any suitably highly hydrogenous material, such as paraffin or hydrocarbon polymer plastic for example, may be used for this purpose. It may also be possible to use steel, tungsten, or other efficient high density neutron scatterers as a shielding material. The entire logging instrument, if desired, may be decentralized in the borehole using technology common in the art.

Detector 20 is a fast neutron detector connected to an amplifier 23, which in turn is connected to one input of a mixer/amplifier circuit 25. Together they provide the fast neutron count rate for the source/detector spacing of detector 20. (Should such a detector also be sensitive to high energy gamma radiation produced by the capture and/or inelastic scattering in the adjacent earth formations of neutrons from the neutron source, these can be discriminated out by the circuitry in amplifier 23. That is, the pulse shape characteristics of the gamma ray interactions produced by such reactions can be distinguished from the pulse shape characteristics in such a detector which are provided by the interaction of fast neutrons with the detector material.) In an alternate design, if detector 20 is a gamma sensing detector, then it can preferentially detect inelastic gamma rays (which are directly related to the fast neutron population) by utilizing a pulsed 14 Mev neutron source and detecting during the first part of the neutron burst prior to capture interference, as is known in the art. Detector 20 thus provides electrical pulse signals which are representative of the numbers of the fast neutron present at its location, either by detecting the fast neutrons directly, or by measuring the resulting inelastic gammas. These electrical signals, multiplexed by circuit 25, are then transmitted via conductors in cable 16 to a surface demultiplexer circuit 26. Output signals from the demultiplexer circuit 26 comprise signals representative of the fast neutrons in the vicinity of the detector 20. The fast neutron signals may then be supplied to one of a plurality of pulse counters (two counters 27 and 28 being shown).

A second radiation detector 40 is also provided in sonde 15. Detector 40 is an epithermal neutron detector located at a different (preferably greater) distance (source/detector spacing) from source 18 than detector 20. Detector 40 may comprise, for example, a pressurized He³ detector which is sensitive to neutrons in the epithermal energy range from approximately 0.178 ev to approximately 1.46 ev. This is contrasted with the fast neutron detector 20 which is essentially sensitive to fast neutrons having energies in the range of from roughly 0.2 Mev to 12 Mev (or alternatively, to inelastic gamma rays). Thus, the two detectors 20 and 40 provide signals from two very different energy bands or windows in which the corresponding neutron population energy spectra may be observed by the downhole well logging sonde 15.

The epithermal neutron detector 40 may be embedded in a layer of hydrogenous material 41 and is surrounded by a relatively thin (e.g., 0.02 inch) layer of thermal neutron absorbing material 42, such as cadmium or the like. Detector 40 is thus shielded from the interaction of thermalized neutrons due to the action of the cadmium layer 42 which, having an extremely large thermal neutron capture cross-section, effectively absorbs all or almost all thermal neutrons in the vicinity of detector 40, before these neutrons can impinge upon and interact with detector 40.

Output signals from the epithermal neutron detector 40 are supplied via an amplifier 43 to another input of the mixer amplifier portion of circuit 25. After transmission to the surface, the signals from the two detectors may then be discriminated from each other by demultiplexing in circuit 26, for example, in a manner known in the art.

As described further below, it has been found that the ratio of the counts from the two detectors will provide an especially good functional relation indicative of the porosity of the earth formations in the vicinity of the downhole sonde. Counters 27 and 28 are therefore selected to provide separate counts of the number of fast neutrons (or inelastic gamma rays) present and the number of epithermal neutrons present in the vicinity of detector 20. In the preferred embodiment, these separate counts are then input to a digital ratio circuit 49 which develops this functional relation by forming the ratio of the counting rates at the two energies. Additionally, in the preferred embodiment, circuit 49 calibrates this ratio signal according to an appropriate predetermined functional relationship (which can be experimentally determined by known techniques) to derive a porosity signal which is quantitatively representative of the porosity of the earth formations in the vicinity of the borehole.

The output signal from circuit 49 is then supplied to a data recorder 50 which may be of the typical strip chart or film recorder type used in well logging. The recorder 50 provides an output trace of the ratio signal on a record medium 51 as a function of borehole depth. The depth information is obtained, in a conventional manner known in the art, be mechanically or electrically coupling the recorder 50 to the sheave wheel 17, as indicated by the dotted line 53 of FIG. 1.

Figure 2:
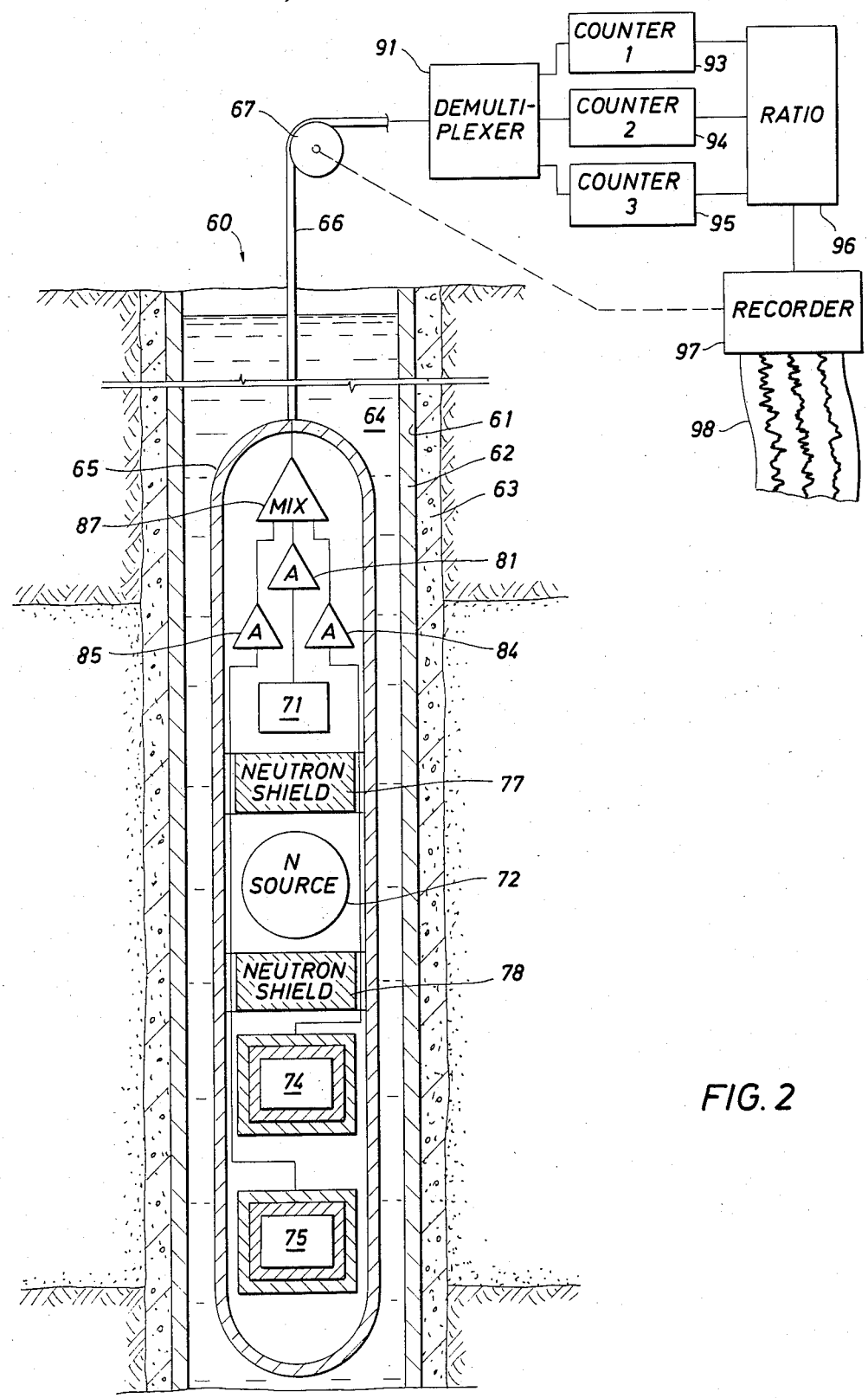
FIG. 2 is a schematic illustration of a well logging system, similar to that of FIG. 1, but having two epithermal neutron detectors and one fast neutron detector, the fast neutron detector and one of the epithermal neutron detectors being equally spaced from the neutron source and lying on opposite sides of the neutron source.

Referring now to FIG. 2, a second embodiment 60 of a well logging system in accordance with the concepts of the present invention is illustrated. As in FIG. 1, the FIG. 2 embodiment shows a well borehole 61 penetrating various earth formations. Borehole 61 is lined with steel casing 62 and surrounded by a cement sheath 63. The cased well borehole is also filled with a well fluid 64. As in FIG. 1, the borehole may also be uncased and filled with a drilling fluid. The downhole sonde 65 is shown suspended in the borehole 61 from a well logging cable 66 which passes around a sheave wheel 67, in a manner similar to that illustrated with respect to embodiment 10 shown in FIG. 1. A decentralizer may also be used to urge the logging tool against the side of the borehole.

Although similar to the FIG. 1 embodiment, the FIG. 2 embodiment locates the fast neutron detector 71 on one side of the neutron source 72, while a pair of epithermal neutron detectors 74 and 75 is located on the opposite side. In the preferred embodiment, detector 71 and detectors 74 and 75 are shielded, respectively, from neutron source 72 by neutron shields 77 and 78. Also, detector 71 is located at the same source/detector spacing as detector 74, while the spacing for detector 75 is greater. Detector 71 is otherwise similar to detector 20; detectors 74 and 75 to detector 40; shields 77 and 78 to shield 32; and source 72 to source 18.

Similarly, detectors 71, 74, and 75 are connected to respective amplifiers 81, 84, and 85, which are connected, in turn, to a mixer/amplifier circuit 87. The electrical output signals from mixer/amplifier circuit 87 are conducted to the surface via well logging cable 66 and supplied to a demultiplexing circuit 91 which serves to separate the signals into that from each of the downhole detectors 71, 74, and 75. The respective signals are supplied to counting circuits 93, 94, and 95, and the output signals of the counters may then be strobed or synchronized into a digital ratio circuit 96 in the manner discussed previously with respect to circuit 49. In the present case (embodiment 60), several ratios may then be provided: a dual-spaced fast/epithermal ratio, a "conventional" fast/epithermal ratio, and a conventional dual-spaced epithermal ratio. Also available, of course, are a fast neutron count rate measurement and one or two epithermal neutron count rate measurements.

The ratio signal(s) output from the ratio circuit(s) 96 is (are) supplied to a recorder 97 which again records this information, as a function of borehole depths, on an output record medium 98. As before, recorder 97 is electrically or mechanically coupled to the sheave wheel 67 to provide such depth information.

While not shown in FIGS. 1 and 2, it will be appreciated by those skilled in the art that conventional electrical power supplies are appropriately situated, for example at the surface, to supply operating voltages and power for the circuit components in the downhole sondes 15 and 65, in a manner known in the art.

The following Monte Carlo calculations, made with program SAM-CE, illustrate the overall concept of the invention. A point AmBe neutron source was simulated in infinite homogeneous limestone formations of differing porosities. Both fast (0.2–12.0 Mev) and epithermal (0.178–1.46 eV) neutron fluxes were calculated in spherical shells at different distances (r) from the source. Table I (below) shows a "conventional" Fast/Epithermal flux ratio, $R_{F/E}$, where each flux was calculated in a 30 cm<r<50 cm spherical shell in $\phi=3\%$ and $\phi=36\%$ limestone formations. A conventional dual-spaced epithermal ratio, $R_E$, is also shown, where $R_E$ is the ratio of the epithermal flux in the 30–50 cm radius annulus to that in the 50–100 cm annulus. The third ratio, $R_{F(SS)/E(LS)}$, is the ratio of the fast flux in the 30–50 cm annulus to the epithermal flux in the 50–100 cm annulus. This last ratio, and the graph of these three ratios shown in FIG. 3, clearly illustrates the very significant improvement provided by the present invention, in which the dual-spaced fast/epithermal ratio has a much greater $\phi$ sensitivity than either of the conventional ratios.

Table I also includes a compilation of $\Delta R/R$, for each of these ratios, between the two different porosity formations. $\Delta R/R$ is indicative of the dynamic range of each type of measurement.

TABLE I

| | $R_{F/E}$ | $R_E$ | $R_{F(SS)/E(LS)}$ |
|---|---|---|---|
| $\phi = 3\%$ | 1.31 | 12.6 | 16.5 |
| $\phi = 36\%$ | 5.30 | 46.2 | 245 |

TABLE I-continued

| | $R_{F/E}$ | $R_E$ | $R_{F(SS)/E(LS)}$ |
|---|---|---|---|
| $\dfrac{R(\phi = 36) - R(\phi = 3)}{R(\phi = 3)}$ | 3.04 | 2.67 | 13.8 |

As may be seen, therefore, the present invention provides numerous advantages. It provides an improved neutron logging method and apparatus for determining the porosity of earth formations in the vicinity of a well borehole. It is versatile, and more or less independent of many of the perturbations affecting typical prior art dual-spaced, dual detector systems. For example, in many such systems the detectors were chosen to be similar for two principal reasons: (1) to reduce the sensitivity of the observed ratio to differences in thermal neutron capture effects in the formation and borehole, and (2) to minimize borehole effects in general. In the present invention, neither the fast neutron sensing detector nor the epithermal detector will be affected by the first of these limitations, because neither detector is sensitive to thermal neutrons or capture gamma radiation. The second limitation can be controlled by compensating any borehole induced sensitivity in the ratio by using a predetermined caliper-based adjustment, as is commonly done with other neutron logging devices.

Still additional advantages are realized with embodiment 60 of the invention, shown in FIG. 2. By having a second epithermal detector positioned at a different distance, a variety of neutron porosity measurements are made possible:

(1) a dual-spaced fast/epithermal measurement;
(2) a "conventional" fast/epithermal measurement;
(3) a conventional dual-spaced epithermal ratio measurement;
(4) a fast neutron count rate measurement; and
(5) one (or two) epithermal neutron count rate measurement(s).

These can then be combined, as desired, into various litho-porosity crossplots, since each will ordinarily be expected to have different lithology effects.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A method for determining the porosity of earth formations in the vicinity of a well borehole, comprising:

(a) irradiating the earth formations in the vicinity of the well borehole with a continuous chemical type source of fast neutrons, (b) detecting the fast neutron population at a first shorter spaced distance from the neutron source in the borehole and generating signals representative thereof, (c) detecting the epithermal neutron population at a second spaced distance from the neutron source in the borehole and generating signals representative thereof, said second spaced distance being greater than the first spaced distance from said neutron source, (d) forming a ratio of the signals representing the fast and epithermal neutron populations to derive a measurement signal functionally related to the porosity of the earth formations in the vicinity of the borehole, and (e) calibrating said measurement signal according to a predetermined functional relationship to derive a porosity signal quantitatively representative of the porosity of the earth formations in the vicinity of the borehole.

2. The method of claim 1 further comprising:

(a) detecting the epithermal neutron population at a third spaced distance from the neutron source in the borehole and generating signals representative thereof, the third spaced distance being equal to the first spaced distance, (b) combining the epithermal neutron population representative signals from the measurements at the third spaced distance with at least one of the fast and the epithermal neutron population representative signals from the first and second spaced distances to derive a second measurement signal functionally related to the porosity of earth formations in the vicinity of the borehole, and (c) combining said measurement signals to derive an indication of the lithology of the earth formations in the vicinity of the well borehole.

* * * * *